United States Patent
Hwang et al.

(10) Patent No.: US 12,540,393 B2
(45) Date of Patent: Feb. 3, 2026

(54) ATOMIC LAYER DEPOSITION METHOD

(71) Applicant: National Taiwan University of Science and Technology, Taipei (TW)

(72) Inventors: Bing-Joe Hwang, Taipei (TW); Sheng-Chiang Yang, Taipei (TW); Chun-Huang Xu, Taipei (TW); Wei-Nien Su, Taipei (TW); Ping-Chun Tsai, Taipei (TW); Kuan-Lin Chu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 257 days.

(21) Appl. No.: 18/304,449

(22) Filed: Apr. 21, 2023

(65) Prior Publication Data

US 2024/0240315 A1  Jul. 18, 2024

(30) Foreign Application Priority Data

Jan. 18, 2023 (TW) .................................. 112102178

(51) Int. Cl.
| | | |
|---|---|---|
| *C23C 16/56* | (2006.01) | |
| *C23C 16/40* | (2006.01) | |
| *C23C 16/455* | (2006.01) | |
| *H01M 4/04* | (2006.01) | |
| *H01M 4/1391* | (2010.01) | |

(52) U.S. Cl.
CPC ...... *C23C 16/45527* (2013.01); *C23C 16/403* (2013.01); *C23C 16/409* (2013.01); *C23C 16/45553* (2013.01); *C23C 16/56* (2013.01); *H01M 4/0428* (2013.01); *H01M 4/1391* (2013.01)

(58) Field of Classification Search
CPC ...... C23C 16/403; C23C 16/409; C23C 16/56
See application file for complete search history.

(56) References Cited

U.S. PATENT DOCUMENTS

| | | | | |
|---|---|---|---|---|
| 2005/0277304 A1* | 12/2005 | My Ali | ................. | C03C 17/256 |
| | | | | 438/785 |
| 2014/0235901 A1* | 8/2014 | Gadewar | ................ | B01J 8/0457 |
| | | | | 568/918 |
| 2019/0300463 A1* | 10/2019 | Corma Canos | ...... | B01J 23/8926 |
| 2020/0062996 A1* | 2/2020 | Kikuchi | ................. | B32B 27/28 |

FOREIGN PATENT DOCUMENTS

| | | | | |
|---|---|---|---|---|
| CN | 113178546 A | 7/2021 | | |
| CN | 113748536 A | 12/2021 | | |
| TW | 1422702 B  * | 1/2014 | ............. | C23C 16/18 |
| TW | 201835382 A | 10/2018 | | |
| WO | WO 2017/093473 A1 * | 6/2017 | ............. | B01J 37/03 |

OTHER PUBLICATIONS

Kang, Henry, J.H., et al., "Tunable functionalization of silica coated iron oxide nanoparticles achieved through a silanol-alcohol condensation reaction". Chem. Commun., 2019, 55, 10452-10455.*
Ali, Rana Faryad, et al., "Tuning the Surface Chemistry of Second-Harmonic-Active Lithium Niobate Nanoprobes Using a Silanol-Alcohol Condensation Reaction". Langmuir, 2021, 37, 7689-7700.*
Shabany, Hossein, et al., "Alcohol oxidation and aldol condensation during base-catalyzed reaction of primary alcohols with 1-chloroanthraquinone". Tetrahedron Letters 41 (2000) 6705-6708.*

* cited by examiner

*Primary Examiner* — Bret P Chen
(74) *Attorney, Agent, or Firm* — Best & Flanagan LLP

(57) ABSTRACT

A deposition method, comprising the steps of exposing a carrier to moisture, so that a hydroxy group can be distributed on the surface of the carrier, and adding a liquid precursor to the hydroxy group to perform an alcohol condensation reaction to form a target atom layer or a target atom compound layer of the deposition carrier; the process provided by the present invention allows one or more liquid precursors to be freely selected for uniform deposition on the carrier. Compared to the current low-yield dry atomic deposition technology, it has no limitation on the volume of the reaction chamber, no complicated and diverse process, and can be designed as a continuous process to achieve wider industrial availability.

11 Claims, 7 Drawing Sheets

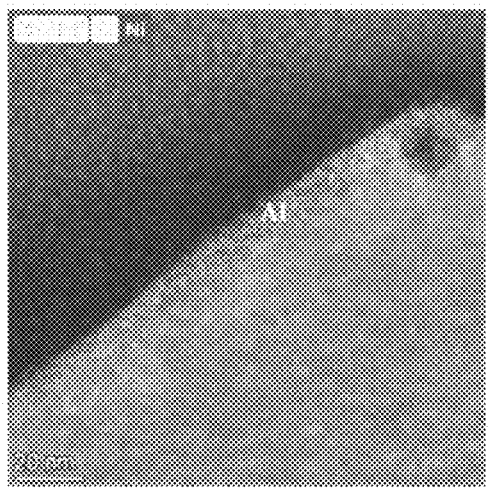
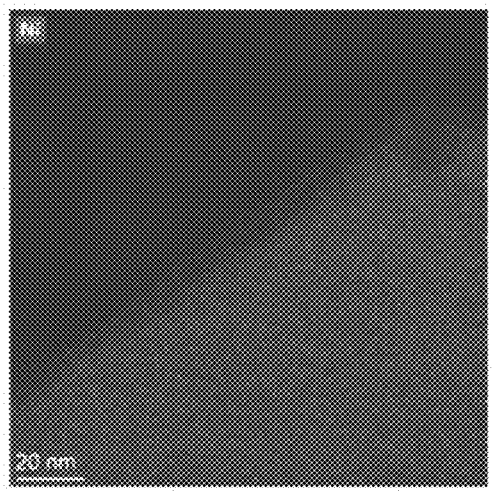
FIG. 3A                                   FIG. 3B
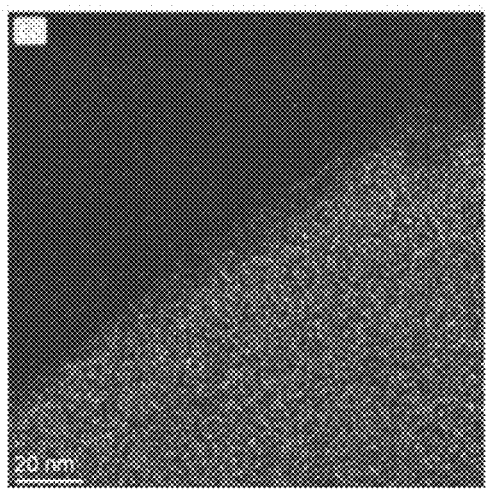
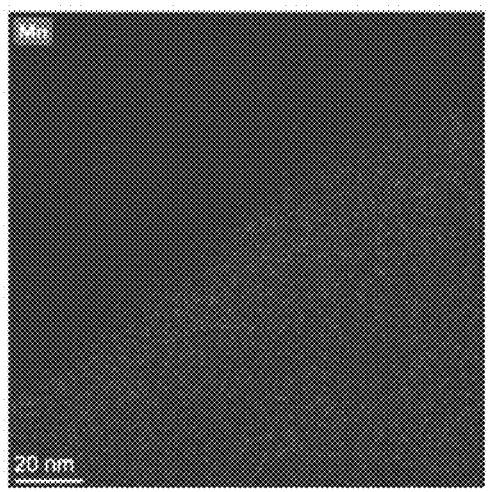
FIG. 3C                                   FIG. 3D

ATOMIC LAYER DEPOSITION METHOD

FIELD OF INVENTION

The present invention is related to a deposition method, in particular a method of depositing specific atoms or chemical functional groups on a carrier by a liquid precursor, continuous deposition system, and applications thereof.

BACKGROUND OF THE INVENTION

Atomic Layer Deposition (ALD) is a method of depositing atoms layer by layer on the surface of a carrier (or substrate). Current ALD is a dry ALD process, as its steps and technologies are so complicated and diverse that it is still not applicable in the industry today.

The dry ALD process generally consists of two major steps of precursor adsorption on the powder and oxidant reaction, which also can be subdivided into four sub-steps for processing.

Step (1) the reaction of precursor gasification and adsorption on the powder, step (2) vacuuming or inert-gas purging to remove excess precursors and possible by-products of the process, step (3) the following adsorption reactions and steps for oxidant gasification, step (4) vacuuming or inert-gas purging to remove excess oxidant and possible by-products.

The above four steps are to complete one ALD cycle. By repeating the previous steps several times, the number of layers of target atoms deposited on or grown on the carrier can be controlled.

At present, the main reasons why this technology is still difficult to commercialize and cannot be produced on a large scale include:
1. The powdered precursors and oxidants must be disturbed and flown to achieve adsorption on the carrier surface.
2. The precursors and oxidants in the process need to maintain gasification and continue to fly, resulting in high energy consumption.
3. To remove excess precursors or oxidants, vacuuming or inert-gas purging is required in the process because excess precursors or oxidants cannot be recycled, which creates waste, and vacuuming or inert-gas purging also increases the cost during the process.
4. The powder tends to adhere to the wall of the reaction chamber, so the chamber must be cleaned between batches.

Hence, it is eager to have a new deposition method that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to overcome various shortcomings of the present atomic layer deposition process using powder-based reactants and a dry process, the present invention first provides a deposition method comprising the steps of:
Step 1: providing a carrier;
Step 2: exposing the carrier to moisture for a predetermined time such that a hydroxy group is distributed on the surface of the carrier;
Step 3: adding a liquid precursor comprising a precursor and a corresponding solvent, the precursor comprising at least one target atom and a functional group capable of undergoing an alcohol condensation reaction with the hydroxy group;
Step 4: bonding the functional group of the precursor to the hydroxy group on the surface of the carrier to perform an alcohol condensation reaction such that the target atom is bonded to the surface of the carrier through the functional group; and
Step 5: calcining the resulting product which is dried so that the target atom forms a stable layer of a target atom or a layer of a target atom compound bonded to the surface of the carrier.

Furthermore, the present invention also provides a continuous deposition system according to the aforementioned deposition method, which includes a first mixing zone, a second mixing zone, and a product drying and calcining zone, and those three are interconnected by materials, wherein:
the first mixing zone is connected to a moisture supply unit and a carrier supply unit respectively which are fed into the first mixing zone for a reaction respectively, so that the hydroxy group is distributed on the surface of the carrier;
introducing the carrier in which the hydroxy group is distributed into the second mixing zone, the second mixing zone having a liquid precursor supply unit, a residual liquid precursor discharge outlet, and a product discharge outlet. After the carrier in which the hydroxy group is distributed has reacted with the liquid precursor in the second mixing zone, if there is any residual liquid precursor, it is discharged from the residual liquid precursor discharge outlet, and the product is discharged from the product discharge outlet.

Furthermore, the present invention also provides a electrochemical application having a electrode material comprising a layer of the target atom or a layer of the target atom compound obtained by the deposition method described above.

In accordance, the present invention has the following advantages and beneficial effects as following:
1. The present invention provides a new type of wet atomic deposition technology in which one or more precursors can be freely selected for uniform deposition on the carrier powder. Compared to today's low-yield dry atomic deposition technology, there is no limitation on the volume of the reaction chamber and no complicated and diverse manufacturing process.
2. The present invention provides a more economical and convenient process compared to existing deposition methods by using the wet atomic deposition technology in which the liquid precursors react with the carriers during the reaction process, eliminating the need to continuously maintain the precursor in a flying state as in the dry process, and eliminating the need to stop and sweep the powder during the process.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

FIGS. 3A to 3D are the Transmission Electron Microscope images (TEM) of the first preferred embodiment of the deposition method;

DETAILED DESCRIPTION OF THE PREFERRED EMBODIMENTS

Figure 1:
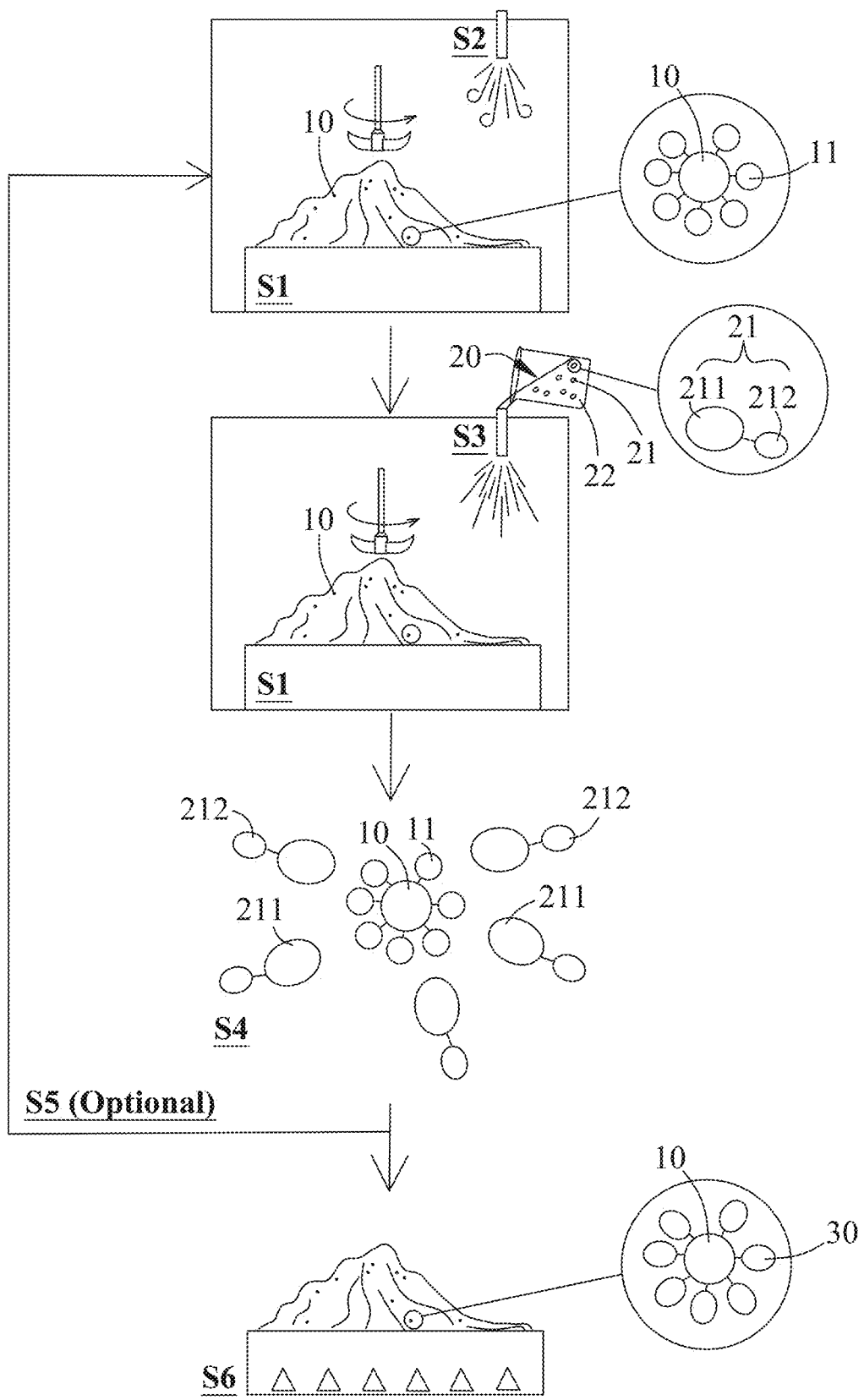
FIG. 1 is a schematic diagram of a preferred process for the deposition method of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIG. 1, the present invention provides a deposition method comprising the steps of:

Step S1) providing a carrier 10, preferably in the form of powder or particles;

Step S2) exposing the carrier 10 to moisture for a predetermined time so that the surface of the carrier 10 is distributed with a hydroxy group 11 (also known as —OH group); preferably, the carrier 10 can be stirred or turned in this step so that the carrier 10 can fully contact with the moisture as shown in FIG. 1; The carrier 10 of the present invention comprises but not limited to all kinds of electrode material (both positive or negative material) which could be distributed with the hydroxyl group 11 for any electrochemical applications, such as lithium battery or sodium battery.

Step S3) adding a liquid precursor 20 comprising a precursor 21 and a corresponding solvent 22 so that the precursor 21 is dissolved in the solvent 22, preferably comprising anhydrous ethanol, anhydrous ether, anhydrous methanol, and/or anhydrous acetone; the precursor 21 containing at least one target atom 211 and a functional group 212 which can undergo alcohol condensation with the hydroxy group 11, wherein, the precursor 21 being dissolved in the solvent 22 in an amount preferably >0.01 M, more preferably greater than 0.1 M or most preferably greater than 0.5 M, and essentially only a small amount of the precursor 21 is required to carry out the alcohol condensation reaction with at least part of the hydroxy group 11, or even an excess of the precursor 21, the alcohol condensation reaction can be carried out with most or all of the hydroxy group 11;

Step S4) bonding the functional group 212 of the precursor 21 to the —OH group on the surface of the carrier 10 to perform an alcohol condensation reaction so that the target atom 211 is bonded to the surface of the carrier 10 through the functional group 212; preferably, the functional group 212 of the precursor 21 is ethoxy (O $C_2H_5$);

Step S5) (optional) repeating the previous Steps 2 to 4 several times as required to achieve the desired number or stacking thickness of target atoms 211 bonded to the surface of the carrier 10; and Step S6) calcining the resulting product obtained in the previous Step 4 or 5 that is dried so that the target atom 211 forms a stable layer of a target atom or a layer of a target atom compound 30 bonded to the surface of the carrier 10. Wherein, the calcination step may result in a greater degree of complete sintering of the organic components of the previous step to form the target atom layer, or it may result in oxidation of the target atom 211 to form the target atom compound layer 30. The temperature of calcination is preferably in the range of 500 to 1500° C.

First Preferred Embodiment

The first preferred embodiment of the deposition method of the present invention is to use a nickel-cobalt-manganese metal oxide (NMC/NMC811) as the carrier 10, and finally deposit the aluminum target atom compound layer (aluminum trioxide, $Al_2O_3$) on its surface and stably bonded to the surface of the carrier 10, comprising the following steps:

Step S1-1) exposing the NMC 10 powder to moisture and controlling the distribution of the —OH group 11 on the surface of the NMC 10;

Step S1-2) adding the liquid precursor 20, in which aluminum triethoxide ($Al(OC_2H_5)_2$) is used as the precursor 21 and anhydrous ethanol (EtOH) is used as the solvent 22; the aluminum triethoxide has an aluminum atom as the target atom 211 and triethanolic group as the functional group 212;

Step S1-3) the triethanolic group in the aluminum triethoxide 21 and the —OH group 11 on the surface of the NMC 10 undergo an alcohol condensation reaction to form —$OAl(OC_2H_5)_2$ which is bonded to the surface of the carrier 10;

Steps S1-4) (optional) repeating the above Steps 1~3 several times as required to achieve the desired number or stack thickness of aluminum atoms (target atoms) 211 and bond them to the surface of the NMC 10; and Steps S1-5) drying and calcining the above product to obtain an $Al_2O_3$-NMC with aluminum trioxide ($Al_2O_3$) as the target atom compound layer 30 stably bonded and loaded on the surface of the carrier 10.

Second Preferred Embodiment

The second preferred embodiment of the deposition method of the present invention, again, using nickel-cobaltmanganese metal oxide (NMC) as the carrier 10, and finally deposit the aluminum target atom compound layer (lithium aluminate, $LiAlO_2$) on its surface and stably bonded to the surface of the carrier 10, comprising the following steps:

Step S2-1) exposing the NMC 10 powder to moisture and controlling the distribution of the —OH group 11 on the surface of the NMC 10;

Step S2-2) adding the liquid precursor 20, in which aluminum triethoxide and lithium hydroxide (LiOH) are used as the first and second precursors and the same anhydrous ethanol is used as the solvent 22; the aluminum atom in the aluminum triethoxide and the lithium atom in the lithium hydroxide are two target atoms 211, and the triethanolic group in the aluminum triethoxide and the hydroxide group in the lithium hydroxide are used as two functional groups 212; the concentration of the aluminum triethoxide and the lithium hydroxide in the anhydrous ethanol is as described above, preferably >0.01M, more preferably greater than 0.1M, or most preferably greater than 0.5, and the equivalent of aluminum triethoxide to lithium hydroxide is preferably between 1:1~1:10, more preferably 1:1~1:5, or best 1:1~1:3;

Step S2-3) the triethanolic group in the aluminum triethoxide 21 and the hydroxide group in the lithium hydroxide react with the —OH group 11 on the surface of the NMC 10 to form $—OLiAl(OC_2H_5)_2$ which is bonded to the surface of the carrier 10;

Steps S2-4) (optional) repeating the above Steps 1~3 several times as required to achieve the desired number or stack thickness of lithium-aluminum (target atoms) 211 and bond them to the surface of the NMC 10; and Steps S2-5) drying and calcining the above product to obtain a $LiAlO_2$-NMC with lithium aluminate ($LiAlO_3$) as the target atom compound layer 30 stably bonded and loaded on the surface of the carrier 10.

Third Preferred Embodiment

The third preferred embodiment of the deposition method of the present invention, again, using nickel-cobalt-manganese metal oxide (NMC) as the carrier 10, and finally deposit the lithium niobium (Nb) target atom compound layer (lithium niobate, $LiNbO_3$) on its surface and stably bonded to the surface of the carrier 10, comprising the following steps:

Step S3-1) exposing the NMC 10 powder to moisture and controlling the distribution of the —OH group 11 on the surface of the NMC 10;

Step S3-2) adding the liquid precursor 20, in which niobium pentaethoxide ($Nb(OCH_2CH_3)_5$) and lithium hydroxide (LiOH) are used as the first and second precursors 21 and the same anhydrous ethanol is used as the solvent 22; the niobium atom in the niobium pentaethoxide and the lithium atom in the lithium hydroxide are two target atoms 211, and the alcohol group in the niobium pentaethoxide and the hydroxide group in the lithium hydroxide are used as two functional groups 212; the concentration of the niobium pentaethoxide and the lithium hydroxide in the anhydrous ethanol is as described above, preferably >0.01M, more preferably greater than 0.1M, or most preferably greater than 0.5, and the equivalent of niobium pentaethoxide to lithium hydroxide is preferably between 1:1~1:10, more preferably 1:1~1:5, or best 1:1~1:3;

Step S3-3) the alcohol group in the niobium pentaethoxide and the hydroxide group in the lithium hydroxide react with the —OH group 11 on the surface of the NMC 10 to form $—OLiAl(OC_2H_5)_2$ which is bonded to the surface of the carrier 10;

Steps S3-4) (optional) repeating the above Steps 1~3 several times as required to achieve the desired number or stack thickness of lithium-niobium (target atoms) 211 and bond them to the surface of the NMC 10; and Steps S3-5) drying and calcining the above product to obtain a $LiNbO_3$-NMC with lithium niobate ($LiNbO_3$) as the target atom compound layer 30 stably bonded and loaded on the surface of the carrier 10.

<Table of Each Reaction Material Type>

Please refer to Tables 1~3 below fora summary of the reactants, products and preferred embodiments in the previous reactions of the present invention.

TABLE 1

Embodiment series 1

| Carrier | | | Nickel-cobalt-manganese metal oxide (NMC 811) | |
|---|---|---|---|---|
| Liquid precursor | Precursors | Target atoms Functional groups | Aluminum triethoxide | Aluminum atom Triethanolic group |
| | Solvent | | Anhydrous ethanol | |
| Target atom compound layer | | | Aluminum trioxide | |
| Product | | | $Al_2O_3$-NMC | |
| Embodiment No. | | | Embodiment 1-1: $Al_2O_3$-NMC | |

TABLE 2

Embodiment series 2

| Carrier | | | Nickel-cobalt-manganese metal oxide (NMC 811) | |
|---|---|---|---|---|
| Liquid precursor | Precursors | Target atoms Functional groups | aluminum triethoxide, lithium hydroxide | Aluminum atom, lithium atom Triethanolic group, hydroxide group |
| | Solvent | | Anhydrous ethanol | |
| Target atom compound layer | | | Lithium aluminate | |
| Product | | | $LiAlO_2$-NMC | |
| Embodiment No. | | | Embodiment 2-1: $LiAlO_2$-NMC calcining with 1Eq-LiOH Embodiment 2-2: $LiAlO_2$-NMC with 2Eq-LiOH | |

TABLE 3

Embodiment series 3

| Carrier | | | Nickel-cobalt-manganese metal oxide (NMC 811) | |
|---|---|---|---|---|
| Liquid precursor | Precursors | Target atoms Functional groups | Niobium pentaethoxide, lithium hydroxide | Niobium atom, lithium atom Alcohol group, hydroxide group |
| | Solvent | | Anhydrous ethanol | |
| Target atom compound layer | | | Lithium niobate | |
| Product | | | $LiNbO_3$-NMC | |
| Embodiment No. | | | Embodiment 3-1: $LiNbO_3$-NMC calcining under 500° C. Embodiment 3-2: $LiNbO_3$-NMC calcining under 700° C. | |

In summary, the suitable precursors of the present invention are preferred to be an ethoxide or partially ethoxide compound containing element(s) listed below with ethoxide functional group. The said element comprises Na, Zr, Al, Ta, Mg, K, Li, Sb, Ti, Nb, Ge, B, Si, W, Y, V, Mo, Fe, Ni or In.

<Preferred Embodiment of Continuous Deposition System>

Figure 2:
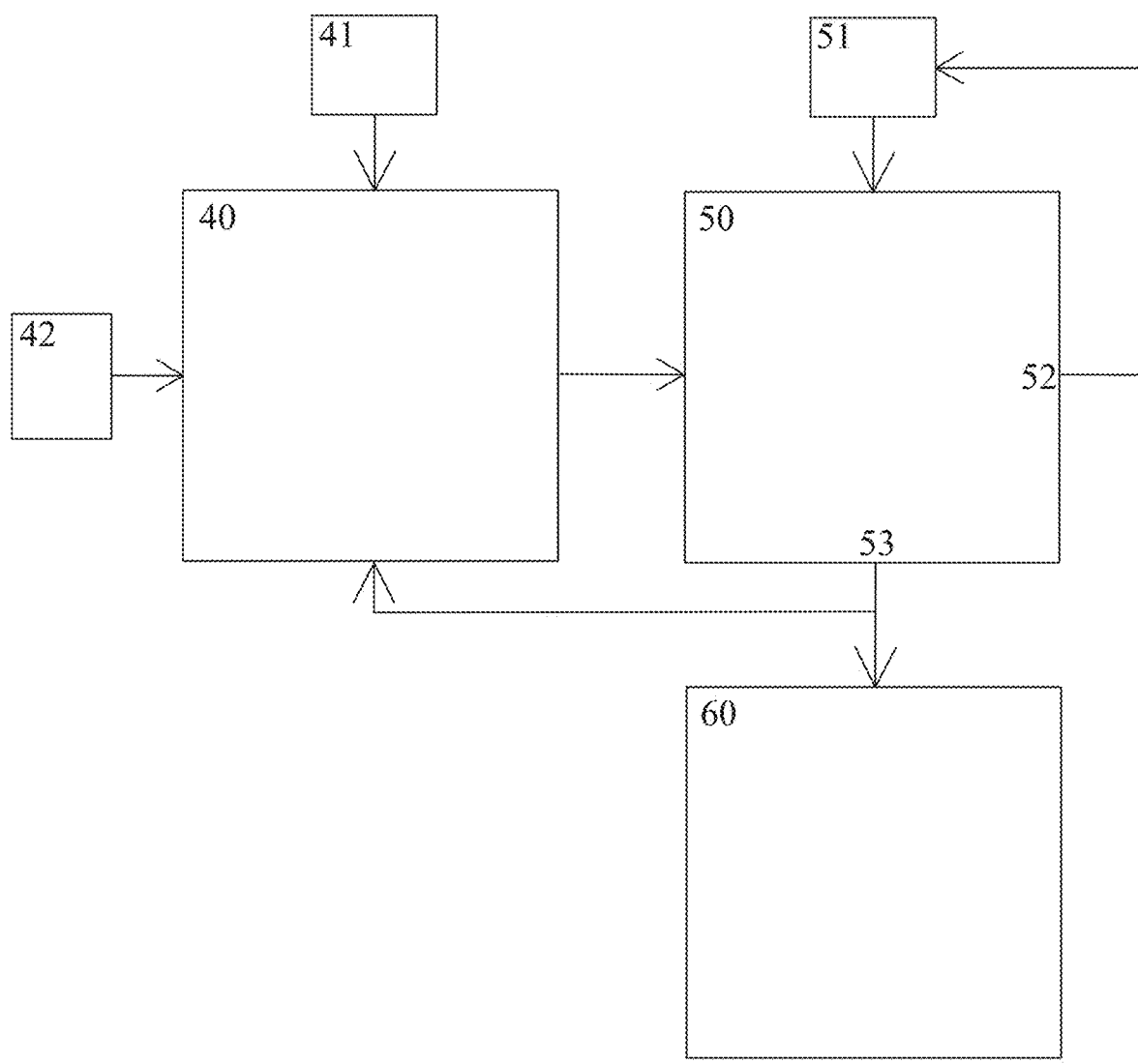
FIG. 2 is a preferred schematic diagram of the continuous deposition system of the present invention.

Referring to FIG. 2, the present invention provides a continuous deposition system according to the above deposition method, comprising: a first mixing zone 40, a second mixing zone 50, and a product drying and calcining zone 60, and those three interconnected by materials.

The first mixing zone 40 is connected to a moisture supply unit 41 and a carrier supply unit 42 which are fed into the first mixing zone 40 for reaction respectively, corresponding to the above method to react the moisture with the carrier 10, so that the —OH group 11 is distributed on the surface of the carrier 10;

introducing the carrier 10 in which the —OH group 11 is distributed into the second mixing zone 50, which is provided with a liquid precursor supply unit 51, a residual liquid precursor discharge outlet 52, and a product discharge outlet 53. After the carrier 10 in which the —OH group 11 is distributed has reacted with the liquid precursor 20 in the second mixing zone 50, if there is any residual liquid precursor 20, it is discharged from the residual liquid precursor discharge outlet 52, and the product is discharged from the product discharge outlet 53, and depending on the process requirements, is redirected to the first mixing zone 40 or to the product drying and calcining zone 60 for drying and calcining.

<Validation Tests>

Referring to FIGS. 3A~3D, which are Transmission Electron Microscope (TEM) images of the first preferred embodiment of the above-mentioned deposition method, in FIG. 3A clearly shows that aluminum atoms are distributed on the surface of the carrier 10 and that the carrier 10 is formed of NMC metal oxides of nickel, cobalt, and manganese.

Figure 4:
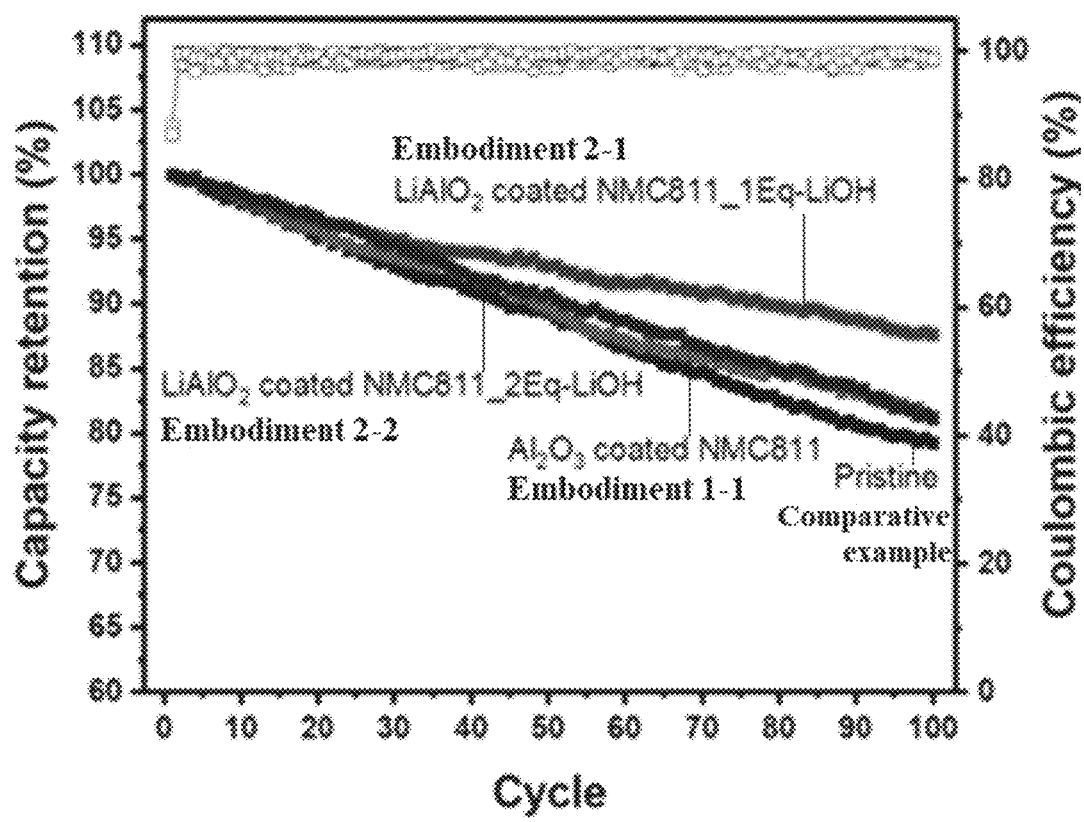
FIG. 4 is a comparison test of capacitance and coulombic efficiency of several preferred embodiments of the present invention and a comparative example.

Please referring to FIG. 4, which are the preferred embodiments of embodiment 1-1: $Al_2O_3$-NMC, embodiment 2-1: $LiAlO_2$-NMC_1Eq-LiOH (using 1Eq LiOH) and embodiment 2-1: $LiAlO_2$-NMC_2Eq-LiOH (using 2Eq LiOH) produced by the first and second preferred embodiments of the aforementioned deposition method and the pristine NMC without a deposition coating as a comparative example that is respectively made as the cathodes (or positive electrodes) and assembled into an electrochemical battery (Li/NMC811) for a capacitance and coulombic efficiency comparison test. The electrochemical battery uses a liquid electrolyte of 1M LiPF6 in EC/DEC (1:1) solvent, the measured current is 0.1 C, and the cut-off voltage is 3.0~4.3V.

As can be seen in FIG. 4, each embodiment of the present invention has shown a better capacitance and coulombic efficiency performance than the pristine group after at least 100 charge and discharge cycles.

Figure 5:
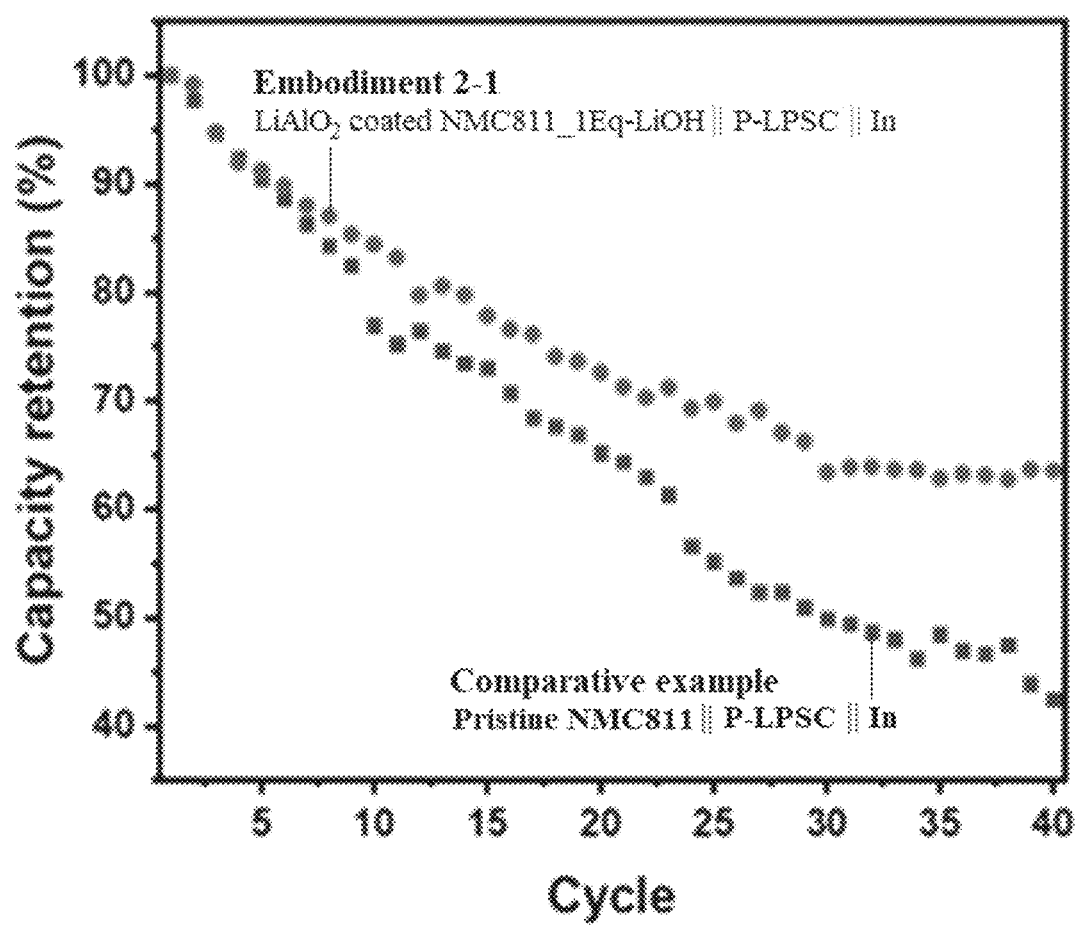
FIG. 5 is a comparison test of capacitance between the preferred embodiment of the present invention and a comparative example.

Referring to FIG. 5, which is embodiment 2-1: $LiAlO_2$-NMC_1Eq-LiOH (using 1Eq LiOH) produced by the second series preferred embodiment of the aforementioned deposition method and the pristine NMC without deposition coating as the comparative example that is respectively made as the cathodes and assembled into an electrochemical battery (NMC811-1% VGCF||P-LPSC||In) for a capacitance comparison test. The electrochemical battery uses a solid electrolyte with 50~55 mg of $Li_6PS_5Cl$ (LPSC) particles, the charge/discharge current is 0.05 C and the voltage is 2.0~3.9V. Since this embodiment is a solid-state battery, the effect of the decomposition of $Li_6PS_5Cl$ (LPSC) particles can be avoided by forming $LiAlO_2$-NMC_1Eq-LiOH from embodiment 2-1 as the positive electrode material.

As can be seen in FIG. 5, the embodiment 2-1 of the present invention has a better capacitance performance than the pristine group after 40 charge and discharge cycles.

Figure 6:
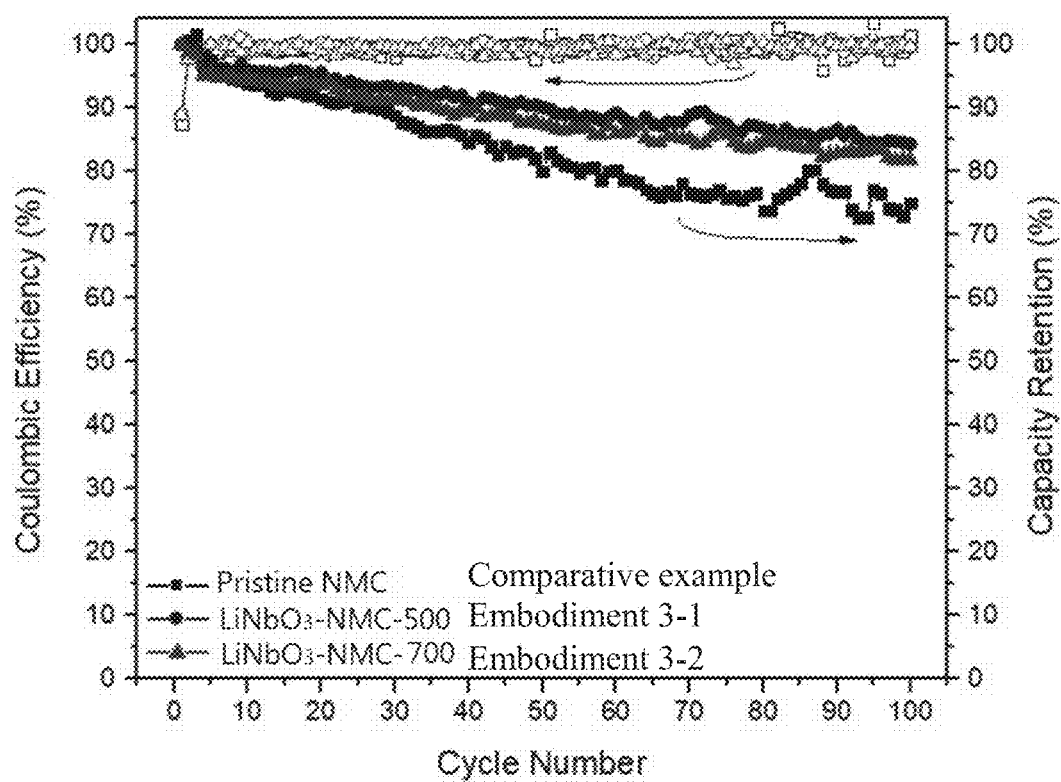
FIG. 6 is a comparison test of capacitance and coulombic efficiency of another preferred embodiment of the present invention and a comparative example.
Figure 7:
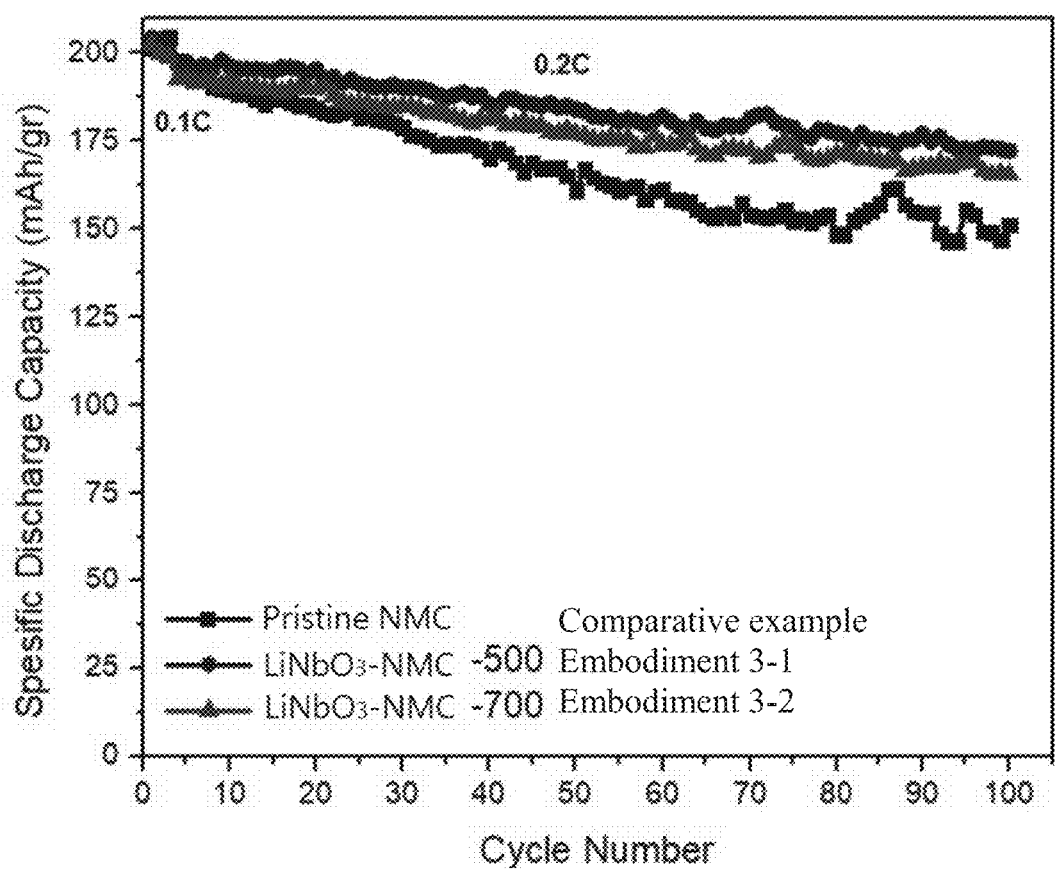
FIG. 7 is a comparison test of specific discharge capacity of another preferred embodiment of the present invention and a comparative example.

Referring to FIGS. 6, 7 and the following Table 4, which are the embodiment 3-1 and 3-2 produced by the third series of preferred embodiment of the aforementioned deposition method ($LiNbO_3$-NMC calcined at 500° C. and 700° C., respectively) and the pristine NMC without deposition coating as the comparative example that is respectively made as the cathodes and assembled into an electrochemical battery (NMC811||1M LiPF6 EC: EMC||In) for a capacitance and coulombic efficiency comparison test. From the results, it can be seen that the present invention has a better residual capacitance and electrical performance than the pristine group after 100 charge and discharge cycles.

TABLE 4

| Name of Sample | Average Coulombic Efficiency (%) after 100 cycles | Discharge Capacitance of the $100^{th}$ cycle | Residual Capacitance (%) of the 100 cycles |
| --- | --- | --- | --- |
| Pristine NMC comparative sample | 99.37 | 151.18 | 75.09 |
| Embodiment 1-1 | 99.45 | 161.70 | 81.60 |
| Embodiment 2-1 | 99.62 | 175.44 | 88.05 |
| Embodiment 2-2 | 99.50 | 176.18 | 81.40 |
| Embodiment 3-1 | 99.39 | 172.28 | 84.34 |
| Embodiment 3-2 | 99.40 | 165.58 | 81.79 |

From the above test, it can be seen that the product made by the deposition method of the present invention can indeed increase the electrical performance of the battery when as a positive electrode material.

Besides the solid state battery, the present invention could also apply to any electrochemical applications such as enzyme, or all kinds of electrode material.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A deposition method, comprising the steps of:
   Step 1: providing a carrier;
   Step 2: exposing the carrier to moisture for a predetermined time such that a hydroxy group is distributed on a surface of the carrier;
   Step 3: adding a liquid precursor comprising a precursor and a corresponding solvent, the precursor comprising at least one target atom and a functional group capable of undergoing an alcohol condensation reaction with the hydroxy group;
   Step 4: bonding the functional group of the precursor to the hydroxy group on the surface of the carrier to perform an alcohol condensation reaction such that the target atom is bonded to the surface of the carrier through the functional group; and
   Step 5: calcining a product after dried so that the target atom forms a stable layer of a target atom or a layer of a target atom bonded to the surface of the carrier.

2. The deposition method according to claim 1, wherein Steps 2~4 are repeated before performing Step 5.

3. The deposition method according to claim 1, wherein the carrier is stirred or turned to increase the uniformity of the exposed moisture when Step 2 is performed.

4. The deposition method according to claim 1, wherein: the liquid precursor comprises the precursor comprising ethoxy as a functional group.

5. The deposition method according to claim 2, wherein: the liquid precursor comprises the precursor comprising ethoxy as a functional group.

6. The deposition method according to claim 3, wherein: the liquid precursor comprises the precursor comprising ethoxy as a functional group.

7. The deposition method according to claim 1, wherein: the solvent comprises anhydrous ethanol, anhydrous ethyl ether, anhydrous methanol, and/or anhydrous acetone.

8. The deposition method according to claim 2, wherein: the solvent comprises anhydrous ethanol, anhydrous ethyl ether, anhydrous methanol, and/or anhydrous acetone.

9. The deposition method according to claim 3, wherein: the solvent comprises anhydrous ethanol, anhydrous ethyl ether, anhydrous methanol, and/or anhydrous acetone.

10. The deposition method according to claim 1, wherein:
the carrier is in the form of a particle or powder which is able to carry the hydroxyl group thereon;
the target atom comprises an aluminum atom, lithium atom, and/or niobium atom;
the target atom layer comprises an aluminum layer, a lithium layer, and/or a niobium layer; and
the target atom compound layer comprises an aluminum oxide layer, a lithium oxide layer, and/or a niobium oxide layer.

11. The deposition method according to claim 10, wherein:
the carrier comprises a electrode material for lithium battery or sodium battery;
the liquid precursor is an ethoxide or partially ethoxide compound containing element(s) list below with ethoxide functional group; wherein: the element comprises Na, Zr, Al, Ta, Mg, K, Li, Sb, Ti, Nb, Ge, B, Si, W, Y, V, Mo, Fe, Ni or In; and
the target atom compound layer comprises an aluminum trioxide, a lithium aluminate, or a lithium niobate.

* * * * *